US012369015B2

(12) United States Patent
Barritt et al.

(10) Patent No.: US 12,369,015 B2
(45) Date of Patent: *Jul. 22, 2025

(54) METHOD AND SYSTEM FOR DELIVERING CONTENT OVER TRANSIENT ACCESS NETWORKS

(71) Applicant: Aalyria Technologies, Inc., Livermore, CA (US)

(72) Inventors: Brian Barritt, San Jose, CA (US); Sharath Ananth, Cupertino, CA (US)

(73) Assignee: AALYRIA TECHNOLOGIES, INC., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,304

(22) Filed: Apr. 26, 2024

(65) Prior Publication Data
US 2024/0283836 A1 Aug. 22, 2024

Related U.S. Application Data

(63) Continuation of application No. 18/047,890, filed on Oct. 19, 2022, now Pat. No. 12,003,561, which is a
(Continued)

(51) Int. Cl.
*H04L 65/612* (2022.01)
*H04L 65/65* (2022.01)
(Continued)

(52) U.S. Cl.
CPC ............ *H04W 4/20* (2013.01); *H04L 65/612* (2022.05); *H04L 65/65* (2022.05); *H04L 67/306* (2013.01);
(Continued)

(58) Field of Classification Search
CPC . H04L 65/612; H04L 67/535; H04L 67/5681; H04L 65/65; H04L 67/306; H04L 69/08; H04N 21/47202; H04W 4/20
See application file for complete search history.

(56) References Cited

U.S. PATENT DOCUMENTS 7,039,428 B1 5/2006 Helferich
7,353,339 B2 4/2008 Komarla et al.
(Continued)

OTHER PUBLICATIONS

Barritt, et al., "Operating a UAV Mesh & Internet Backhaul Network using Temporospatial SON", IEEE Aerospace Conference, 2017, 7 pages.
(Continued)

*Primary Examiner* — Mohamed A. Wasel
(74) *Attorney, Agent, or Firm* — BAKER HOSTETLER, LLP

(57) ABSTRACT

An end user premises device is provided that includes a memory, one or more transceivers, and one or more processors. The one or more transceivers are configured to communicate with one or more stations in a network and a client device. The one or more processors are configured to receive a first user request for data from the client device using the one or more transceivers, determine a first point in time for retrieving the data based on an amount of charge in batteries of the one or more stations in the network, retrieve, at the first point in time, the data from a remote server via the network using the one or more transceivers, store the data in the memory, and in response to a second user request, transmit the data to the client device using the one or more transceivers.

20 Claims, 6 Drawing Sheets

Related U.S. Application Data continuation of application No. 17/405,268, filed on Aug. 18, 2021, now Pat. No. 11,516,268, which is a continuation of application No. 16/829,002, filed on Mar. 25, 2020, now Pat. No. 11,122,097, which is a continuation of application No. 15/647,811, filed on Jul. 12, 2017, now Pat. No. 10,645,133.

(51) Int. Cl.
  *H04L 67/306* (2022.01)
  *H04L 67/50* (2022.01)
  *H04L 67/5681* (2022.01)
  *H04L 69/08* (2022.01)
  *H04N 21/472* (2011.01)
  *H04W 4/20* (2018.01)

(52) U.S. Cl.
  CPC ........ *H04L 67/535* (2022.05); *H04L 67/5681* (2022.05); *H04L 69/08* (2013.01); *H04N 21/47202* (2013.01)

(56) References Cited

U.S. PATENT DOCUMENTS

| | | |
|---|---|---|
| 7,570,654 B2 | 8/2009 | Muthukrishnan et al. |
| 8,116,632 B2 | 2/2012 | Miniscalco et al. |
| 8,194,569 B2 | 6/2012 | Shorty et al. |
| 8,364,655 B2 | 1/2013 | Hom et al. |
| 8,913,894 B2 | 12/2014 | Coleman et al. |
| 8,989,586 B2 | 3/2015 | Arnold et al. |
| 9,042,734 B2 | 5/2015 | Makowski et al. |
| 9,269,251 B2 | 2/2016 | LaLonde et al. |
| 9,270,372 B2 | 2/2016 | Miniscalco |
| 9,294,582 B2 | 3/2016 | Tuliani et al. |
| 9,369,198 B2 | 6/2016 | Beals et al. |
| 9,432,332 B2 | 8/2016 | Ilyadis et al. |
| 9,438,341 B2 | 9/2016 | Brumley, II et al. |
| 9,485,640 B2 | 11/2016 | Bowers et al. |
| 9,503,176 B2 | 11/2016 | Beals et al. |
| 9,578,584 B1 | 2/2017 | Oroskar et al. |
| 9,613,158 B1 | 4/2017 | Lepeska |
| 10,002,373 B1 | 6/2018 | Voskamp |
| 10,135,527 B1 | 11/2018 | Csonka et al. |
| 10,218,811 B1 | 2/2019 | Demsey |
| 10,764,933 B2 | 9/2020 | Mehrabanzad et al. |
| 11,044,694 B2 | 6/2021 | Ananth |
| 11,157,493 B2 | 10/2021 | Yung et al. |
| 2005/0030953 A1 | 2/2005 | Vasudevan et al. |
| 2007/0010268 A1 | 1/2007 | Kim et al. |
| 2009/0168795 A1 | 7/2009 | Segel |
| 2010/0332586 A1 | 12/2010 | Jogand-Coulomb et al. |
| 2012/0151000 A1 | 6/2012 | Snodgrass et al. |
| 2012/0159558 A1 | 6/2012 | Whyte et al. |
| 2014/0379835 A1* | 12/2014 | Foerster ................. H04L 67/62 709/213 |
| 2015/0207691 A1 | 7/2015 | Price |
| 2015/0212943 A1 | 7/2015 | Yang et al. |
| 2017/0041074 A1 | 2/2017 | Wang et al. |
| 2017/0238257 A1 | 8/2017 | Killen et al. |
| 2017/0272173 A1 | 9/2017 | Ito |
| 2017/0286119 A1 | 10/2017 | Al Sheikh et al. |
| 2018/0279199 A1* | 9/2018 | Karakkad Kesavan Namboodiri ......... H04W 48/16 |

OTHER PUBLICATIONS

Barritt, et al., "SON Enhancements for LEO Satellite Networks", 34th AIM International Communications Satellite Systems Conference, International Communications Satellite Systems Conferences ICSSC), Oct. 2016, 10 pages.

Barritt, et al., "Temporospatial SON for Aerospace Communications", Aim Space 2015 Conference and Exposition, Aim Space Forum, 2015, 5 pages.

Wikipedia, "Forwarding Information Base (FIB) ", Available online at: , retrieved on May 24, 2017, 4 pages.

* cited by examiner

METHOD AND SYSTEM FOR DELIVERING CONTENT OVER TRANSIENT ACCESS NETWORKS

CROSS REFERENCE TO RELATED APPLICATIONS

The present application is a continuation of U.S. patent application Ser. No. 18/047,890, filed Oct. 19, 2022, which is a continuation of U.S. patent application Ser. No. 17/405,268, filed Aug. 18, 2021, issued as U.S. Pat. No. 11,516,268, which is a continuation of U.S. patent application Ser. No. 16/829,002, filed Mar. 25, 2020, issued as U.S. Pat. No. 11,122,097, which is a continuation of U.S. patent application Ser. No. 15/647,811, filed Jul. 12, 2017, issued as U.S. Pat. No. 10,645,133, the disclosures of which are incorporated herein by reference.

BACKGROUND

The relatively high $/GB cost of mobile data plans prevents users from using their mobile (2G, 3G, or 4G) service to consume rich content like video. And often, users in emerging markets do not have affordable options to purchase uncapped, fixed-broadband (DSL, Cable, etc.) service.

BRIEF SUMMARY

Aspects of the disclosure provide for an end user premises device. The end user premises device includes a memory, one or more transceivers, and one or more processors. The one or more transceivers are configured to communicate with one or more stations in a network and a client device. The one or more processors are configured to receive a first user request for data from the client device using the one or more transceivers and determine a first point in time for retrieving the data. The first point in time may be during off-peak hours and before a second point in time that the client device is likely to access the data. The one or more processors are configured to retrieve, at the first point in time, the data via the network using the one or more transceivers and store the data in the memory. In response to a second user request, the one or more processors may be configured to transmit the data to the client device using the one or more transceivers.

In one embodiment, the one or more processors are also configured to predict additional data that is likely to be accessed by the client device at a third point in time, retrieve, at a fourth point in time before the third point in time, the additional data using the one or more transceivers, store the additional data in the memory, and in response to a third user request, transmit the additional data to the client device using the one or more transceivers. In another embodiment, the one or more processors are also configured to determine the first point in time based on a topology of the network. In this example, the one or more processors are configured to determine the first point in time by determining one or more routing paths available during the off-peak hours and one or more points in time associated with the one or more routing paths and selecting the first point in time from the one or more points in time associated with the one or more routing paths. In this example, the one or more routing paths is determined based on the topology of the network.

The one or more processors are configured to determine the first point in time based on an amount of charge in batteries of the one or more stations. In a further embodiment, the one or more processors are also configured to determine the second point in time based on an access time included in the first user request. Optionally, the one or more processors are configured to determine the second point in time based on an activity history at the client device. The one or more processors are additionally or alternatively configured to determine that the second user request includes a request for the data stored in the memory.

Other aspects of the disclosure provide for a network. The network includes an end user premises device that includes a memory, one or more transceivers configured to communicate with one or more stations in the network and a client device, and one or more processors. The one or more processors are configured to receive a first user request for data from the client device using the one or more transceivers and determine a first point in time for retrieving the data. The first point in time is during off-peak hours and before a second point in time that the client device is likely to access the data. The one or more processors are also configured to retrieve, at the first point in time, the data via the network using the one or more transceivers and store the data in the memory. In response to a second user request, the one or more processors are configured to transmit the data to the client device using the one or more transceivers.

In one embodiment, the one or more processors are also configured to predict additional data that is likely to be accessed by the client device at a third point in time and retrieve, at a fourth point in time before the third point in time, the additional data using the one or more transceivers. The one or more processors in this example are also configured to store the additional data in the memory and, in response to a third user request, transmit the additional data to the client device using the one or more transceivers. In another embodiment, the one or more processors are also configured to determine the first point in time based on a topology of the network. The one or more processors in this example are further configured to determine the first point in time by determining one or more routing paths available during the off-peak hours and one or more points in time associated with the one or more routing paths, the one or more routing paths being determined based on the topology of the network, and selecting the first point in time from the one or more points in time associated with the one or more routing paths.

The one or more processors are optionally configured to determine the first point in time based on an amount of charge in batteries of the one or more stations. In a further embodiment, the one or more processors are also configured to determine the second point in time based on an access time included in the first user request. Optionally, the one or more processors are configured to determine the second point in time based on an activity history at the client device. The one or more processors are additionally or alternatively configured to determine that the second user request includes a request for the data stored in the memory. In yet another embodiment, the network includes a second end user premises device and the one or more stations. The one or more stations in this embodiment are capable of broadcasting the data to the end user premises device and the second end user premises device.

Further aspects of the disclosure provide for a method. The method includes receiving, by one or more processors at an end user premises device, a first user request for data from a client device; determining, by the one or more processors, a first point in time for retrieving the data, the first point in time being during off-peak hours and before a second point in time that the client device is likely to access the data; retrieving, by the one or more processors, the data from a remote server at the first point in time; storing, by the one or more processors, the data in a memory of the end user premises device; and in response to a second user request, transmitting, by the one or more processors, the data to the client device.

In another embodiment, the method also includes predicting, by the one or more processors, additional data that is likely to be accessed by the client device at a third point in time; retrieving, by the one or more processors, the additional data at a fourth point in time before the third point in time; storing, by the one or more processors, the additional data in the memory of the end user premises device; and in response to a third user request, transmitting, by the one or more processors, the additional data to the client device. Additionally or alternatively, the first point in time is determined by determining one or more routing paths available through a network during the off-peak hours and one or more points in time associated with the one or more routing paths, and selecting the first point in time from the one or more points in time associated with the one or more routing paths.

DETAILED DESCRIPTION OVERVIEW

The technology is related to performing Delay Tolerant Network (DTN) protocol or micro-caching of content in a transient access network. The network may comprise non-geostationary satellites or high-altitude platforms and may be a temporospatial software-defined network. The network may include a plurality of network nodes and at least one end user premises device in communication with one or more client devices. The device may include a memory, an antenna configured to communicate with one or more network nodes, and one or more processors.

The end user premises device may be configured to perform DTN protocol or some other store-and-forward protocol. In such cases, the one or more processors may be configured to receive a user request for data and schedule retrieval of the requested data at a first point in time that is before a second point in time during which the user is likely to access the data. The second point in time may optionally be identified by or included in the user request. The first point in time may be chosen by the one or more processors to be (1) during off-peak hours and (2) before the second point in time. Once retrieved according to the scheduled time, the data may be stored in local memory of the end user premises device.

Alternatively or additionally, the end user premises device may be configured to perform micro-caching. For instance, the one or more processors may be configured to determine what data would likely be requested by a user or a plurality of users from a given area. Before receiving a request from the user or one of the plurality of users, the one or more processors may request the data using the network, receive the data from the network, and store the data in local memory of the end user premises device. The receipt of the data may be timed to occur during off-peak hours and before a time when the user or one of the plurality of users is likely to request the data, or a future access time.

The end user premises device may be configured to transmit the stored data to one or more client devices upon receipt of a request by the one or more client devices to access the data stored at the end user premises device. The data may be transmitted via 2G, LTE, Wi-Fi, or any other signal receivable by the one or more client devices.

EXAMPLE SYSTEMS

Figure 1:
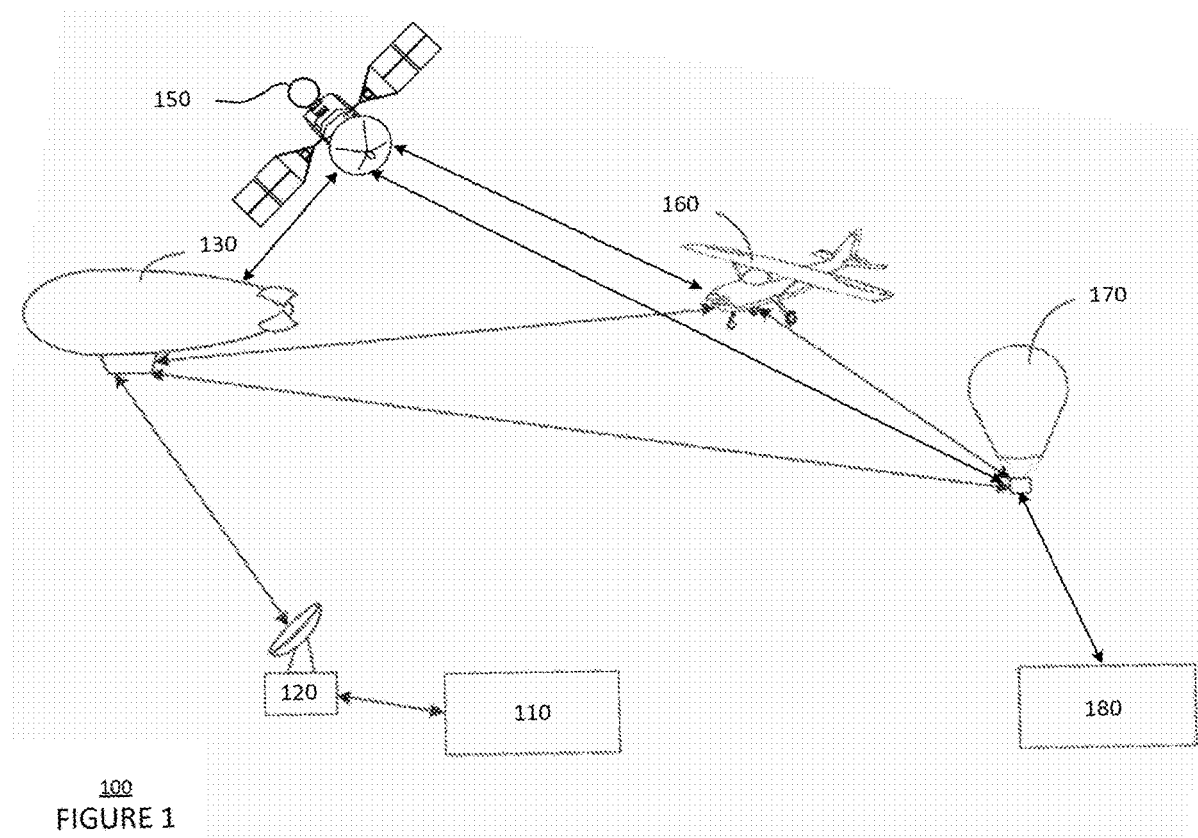
FIG. 1 shows a pictorial diagram of a network 100 in accordance with aspects of the disclosure.

A network may include nodes at various land and air-based stations, as shown in FIG. 1. For instance, network 100 may include a plurality of nodes such as one or more client devices 110, one or more end user premises devices 120, one or more stations 130, 150, 160, 170, and one or more servers 180. The stations may include ground stations and/or HAP stations. HAP stations may include blimps, such as station 130, satellites, such as station 150, airplanes, such as station 160, and balloons, such as station 170. Each station may be configured for FSOC, radio frequency communication, Long-Term Evolution (LTE) or other communication methods and protocols. Arrows shown between a pair of stations represent possible communication links between pairs of stations, such as, for example, optical links for free-space optical communications. End user premises devices 120 may be associated with client device 110, and may be capable of communicating with client device 110 and stations 130, 150, 160, 170.

It should be understood that the network 100 as shown in FIG. 1 is illustrative only, and in some implementations, the network 100 may include additional or different stations. For example, in some implementations, the network 100 may include additional client devices, end user premises devices, stations, and servers. In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger network.

Figure 2:
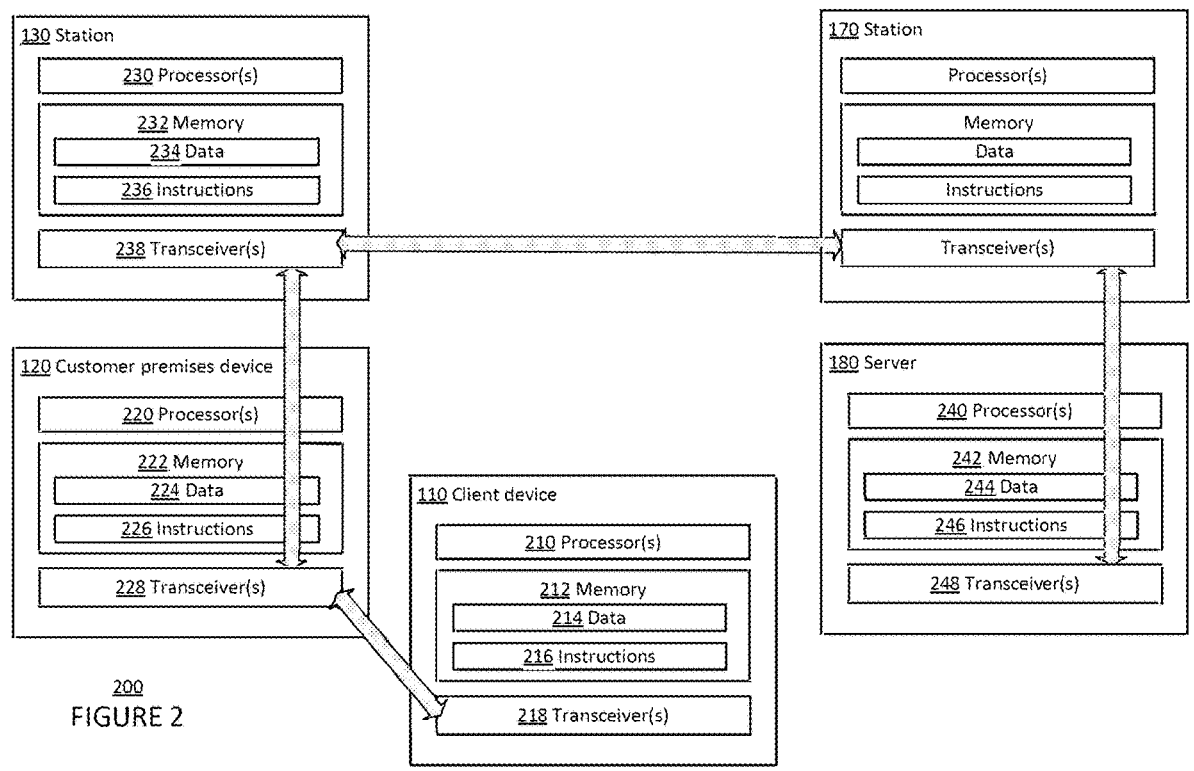
FIG. 2 shows a functional diagram of a routing path 200 through the network 100 in accordance with aspects of the disclosure.

As shown in FIG. 2, each node of the network 100 may comprise one or more processors, a memory, and one or more transceivers. Together, these nodes may form a routing path 200 through the network 100. In FIG. 2, only five nodes of network 100 are depicted for simplicity and ease of understanding. Arrows in FIG. 2 represent a communication link that may be formed between the depicted nodes.

A client device, such as client device 110, may be a personal computing devices or a server with a processor, memory, data, and instructions. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices in accordance with the systems and methods described herein may comprise any device capable of processing instructions and transmitting data to and from humans and other computers including general purpose computers, network computers lacking local storage capability, and set-top boxes for televisions.

In particular, the client device 110 may comprise one or more processors 210, memory 212, and one or more transceivers 218. The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214 and instructions 216 that may be executed by the one or more processors 210. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

Instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance.

The one or more transceivers 218 may be one or more wireless transceivers associated with a cellular or other mobile network, such as eNodeB base stations or other wireless access points, such as WiMAX or UMTS access points. The one or more transceivers 218 may be configured to create one or more links between client device 110 and one or more stations of the network 100, such as station 130. Additionally, the one or more transceivers 218 may also include transceivers configured to create a link, via wire or wirelessly, between client device 110 and end user premises device 120.

End user premises device 120 may comprise one or more processors 220, memory 222, and one or more transceivers 228. The one or more processors 220 may be any well-known processor or a dedicated controller similar to the one or more processors 210 described above. Memory 222 may store information accessible by the one or more processors 220, including data 224 and instructions 226 that may be executed by processor 220. Memory 222, data 224, and instructions 226 may be configured similarly to memory 212, data 214, and instructions 216 described above. In particular, memory 222 may be a local memory configured to store data retrieved over a network, such as network 100, from a remote server, such as server 180, for later access by the client device 110. Instructions 216 may include instructions to process user requests and retrieve data based on the user requests, as described in further detail below. The one or more transceivers 228 may be one or more wireless transceivers configured similarly to the one or more transceivers 218 described above to communicate with one or more stations of the network 100. In addition, the one or more transceivers 228 may also include transceivers configured to communicate via wire or wirelessly with a client device 110.

Referring to station 130 as a reference, each of the stations 130, 150, 160, 170 of network 100 may include one or more processors 230, memory 232, and one or more transceivers 238 as discussed further below. Although the following description relates to the features of station 130, each of the stations of the network 100, regardless of whether land or air-based, may have the same or similar configurations of features.

The one or more processors 230 may be any well-known processor or a dedicated controller similar to the one or more processors 210 described above. Memory 232 may store information accessible by the one or more processors 230, including data 234 and instructions 236 that may be executed by processor 230. Memory 232, data 234, and instructions 236 may be configured similarly to memory 212, data 214, and instructions 216 described above. In particular, data 234 stored in memory 232 may include a routing table that indicates one or more next hops from station 130, and instructions 236 may include instructions to establish one or more links based on the routing table. The routing table may be updated or may include a schedule based on the accessibility of each node in network 100.

The one or more transceivers 238 may be one or more wireless transceivers configured similarly to the one or more transceivers 218 described above to communicate with other stations of the network 100. In some implementations, the one or more transceivers 238 may include free-space optical transceivers configured to form optical links with other stations in the network 100 that also have free-space optical transceivers. Together, stations 130, 150, 160, 170 may form all or part of a wireless access network. Station 130 may also be connected to server 180, for example, via backbone network links or transit networks operated by third parties. The server 180 may be one or more servers operating independently or collectively as a server farm in a datacenter. The server 180 may include applications that are accessed by remote users as well as systems that monitor or control the components of the network 100. Station 130 may provide wireless access for the users, and may route user requests to the server 180 and return responses to the users via the backbone network links. The one or more transceivers 238 may also be configured to create one or more links between station 130 and another node in the network. In addition, the one or more transceivers 238 may also include transceivers configured to communicate with end user premises device 120 and server 180.

For HAP stations, such as station 130, a solar panel and a battery configured to be charged using the solar panel may be included. Depending on the height and location of a given HAP station as well as the weather near the given HAP station, the solar panels of the given HAP station may be exposed to sunlight for a few hours during a single day or for the whole day. When the solar panels are exposed to the sunlight, the given HAP station may be able to operate while the given HAP station is simultaneously or near simultaneously being charged. Performing operations when the solar panels are not exposed to the sunlight would use the charge stored in the battery and, given enough operations over time, may deplete the charge stored in the battery.

Server 180 may include one or more processors 240, a memory, 242, and one or more transceivers 248. The one or more processors 240 may be any well-known processor or a dedicated controller similar to the one or more processors 210 described above. Memory 242 may store information accessible by the one or more processors 240, including data 244 and instructions 246 that may be executed by processor 240. Memory 242, data 244, and instructions 246 may be configured similarly to memory 212, data 214, and instructions 216 described above. The one or more transceivers 248 may be one or more wireless transceivers configured similarly to the one or more transceivers 218 described above to communicate with one or more stations of the network 100.

Figure 3:
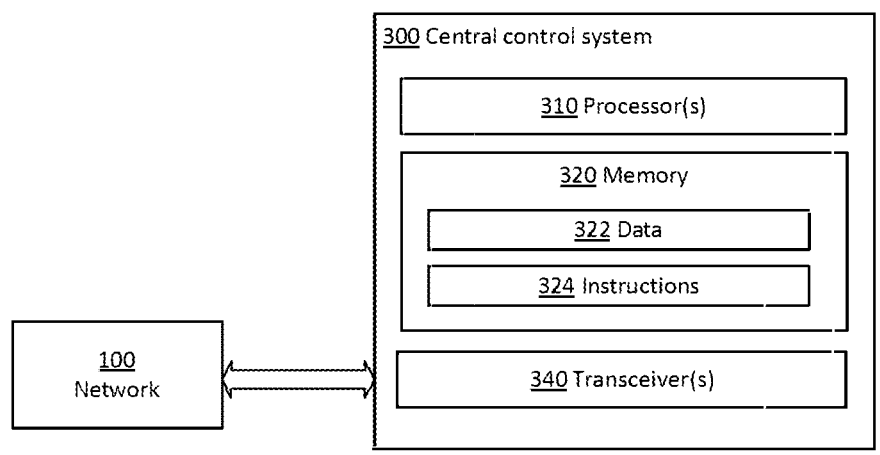
FIG. 3 shows a functional diagram of a central control system 300 in accordance with aspects of the disclosure.

As shown in FIG. 3, some embodiments may include a central control system 300 in communication with the network 100. The central control system 300 may include one or more processors 310, a memory 320, and one or more transceivers 340. The one or more processors 310 may be any well-known processor or a dedicated controller similar to the one or more processors 210 described above. Memory 320 may store information accessible by the one or more processors 310, including data 322 and instructions 324 that may be executed by processor 310. In particular, the data 322 stored in memory 320 may include a routing table for network 100 including indications of the availability of nodes and links over time. Memory 320, data 322, and instructions 324 may be configured similarly to memory 212, data 214, and instructions 216 described above. The one or more transceivers 340 may be one or more wireless transceivers configured similarly to the one or more transceivers 218 described above to communicate with nodes of the network 100.

EXAMPLE METHODS

Figure 4:
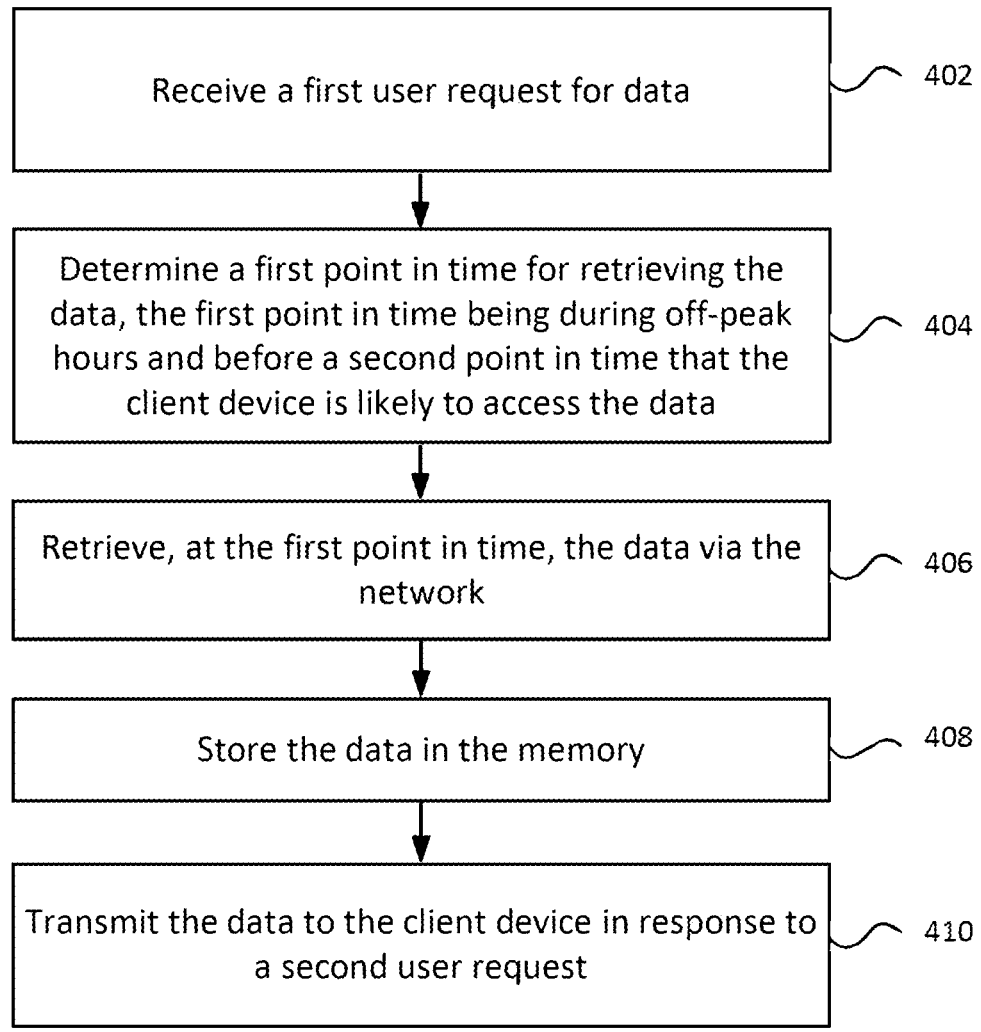
FIG. 4 shows a flow diagram 400 of a method performable by an end user premises device in accordance with aspects of the disclosure.
Figure 5:
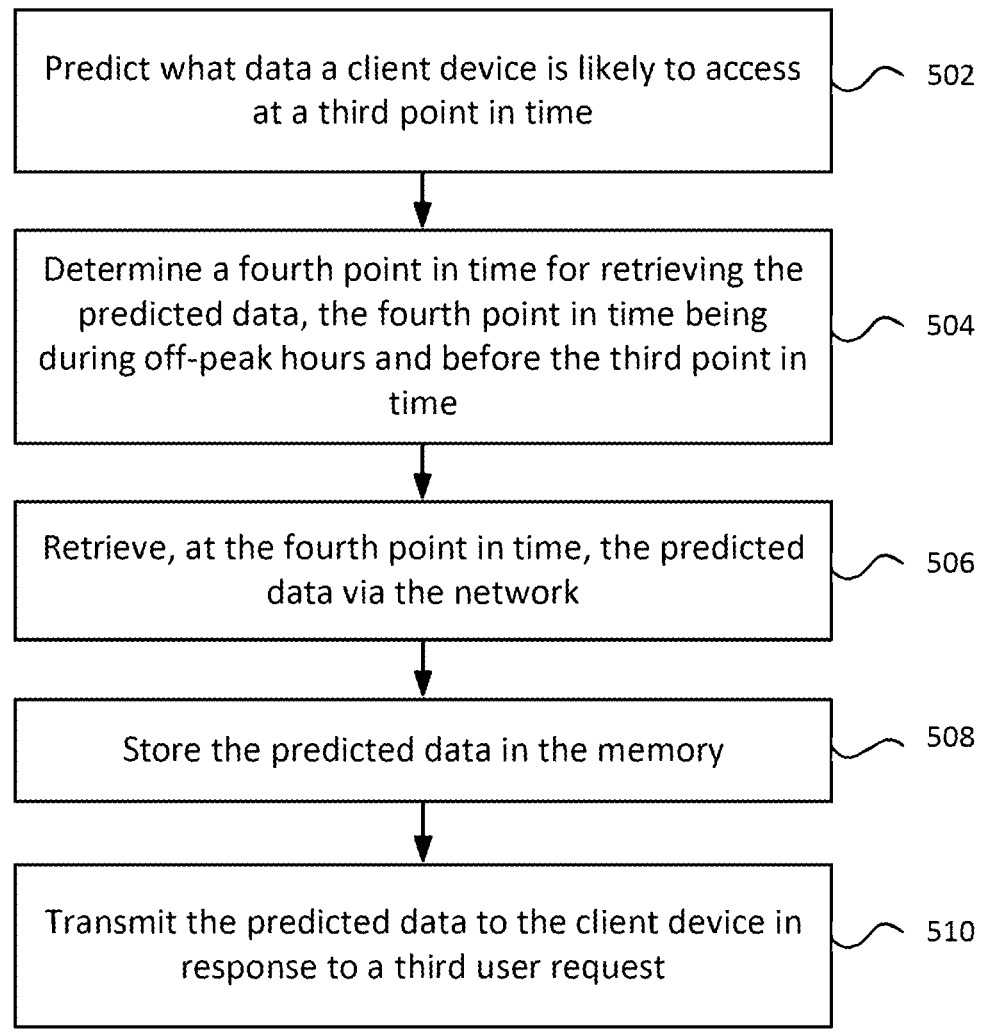
FIG. 5 shows a flow diagram 500 of an additional method performable by an end user premises device in accordance with aspects of the disclosure.
Figure 6:
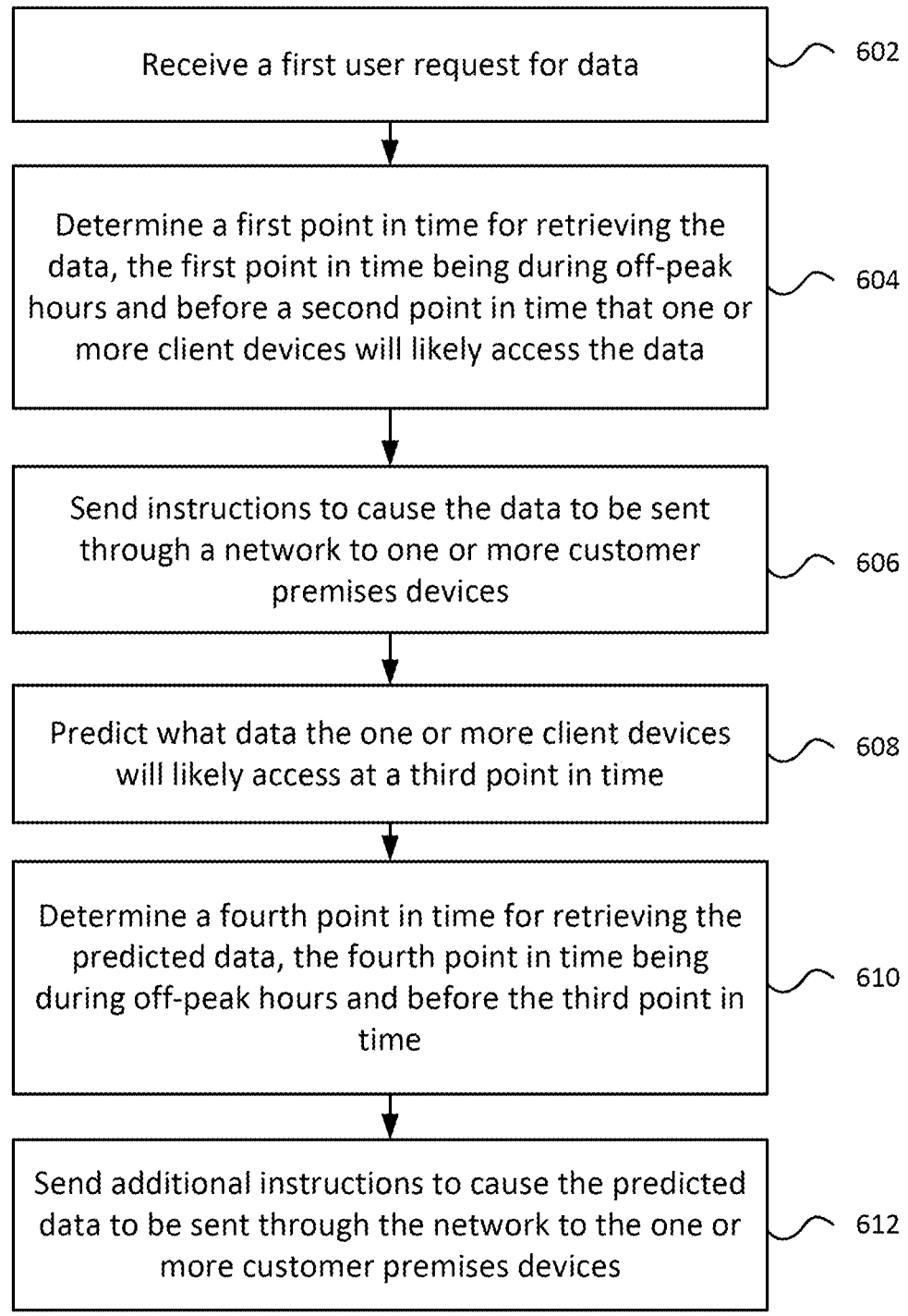
FIG. 6 shows a flow diagram 600 of a method performable by a central control system in accordance with aspects of the disclosure.

In FIGS. 4-6, flow diagrams 400, 500, 600 is shown in accordance with some of the aspects described above that may be performed by the one or more processors 220 of the end user premises device 120 or the one or more processors 310 of the central control system 300. While FIGS. 4-6 shows blocks in a particular order, the order may be varied and that multiple operations may be performed simultaneously. Also, operations may be added or omitted.

FIG. 4 shows a flow diagram 400 that may be performed at the end user premises device 120. At block 402, the one or more processors 220 may receive a first user request for data. The first user request may be sent from the one or more transceivers 218 of the client device 110 or another client device to the one or more transceivers 228 of the end user premises device 120. The first user request may identify data to be retrieved, such as, for example, a webpage, a document, or a video. Data may be identified using a destination address, such as, for example, a URL or other locating means. In the example shown in FIG. 2, the data may be a video file, and the destination address may indicate a location in the memory 242 of server 180.

In some implementations, the first user request may be sent in response to user input received at the client device 110, such as, for example, clicking on a link or image. In some instances, the first user request may also identify a future access time by which the user would like the content to be retrieved.

At block 404, the one or more processors 220 may determine a first point in time for retrieving the data. In some cases, the first point in time may be a range of times. The first point in time may be selected from designated off-peak hours when traffic is likely below a threshold amount. In some areas, off-peak hours may be during, for example, workday hours (e.g., 9 am-5 pm) or sleep hours (e.g., 11 pm-7 am). The first point in time may also be selected to be a time that is before a second point in time that the client device 110 is likely to access the data. The second point in time may be determined based on the future access time provided by the user, if any, and/or based on an activity history of the user at the client device 110. For example, the activity history of the user may indicate that a given user regularly accesses videos after 7 pm. The second point in time may therefore be 7 pm, in which case the first point in time may be any time before then, such as, for example, 4:30 pm.

For a temporospatial network, such as the network 100 described above, determining the first point in time may also take into account a topology of the network and available paths in the network at a particular time or time frame. The first point in time may therefore be selected based on when the one or more processors 220 is able to establish a link with at least one station in the network 100, such as station 130 and when one or more processors having access to the destination address, such as the one or more processors 240 of server 180, is able to establish a link with at least one station in the network.

Referring back to the example in FIG. 2, one or more routing paths between the end user premises device 120 and the destination address at server 180 may be determined based on the topology of the network at a current time or predicted for a future time. A particular routing path may be determined to go from the end user premises device 120 to station 130, station 170, and server 180, and vice versa. It may be determined that the one or more routing paths exist at one or more times within the off-peak hours. Returning to the example, the one or more processors 220 may determine that the particular routing path is available between 4:45 pm and 5 pm. The first point in time may therefore be determined to be 4:45 pm.

The first point in time may further be determined based on an amount of charge in batteries of one or more of the nodes in the network 100. When the network includes stations with limited power supply, such as, for example, solar-powered HAP stations, the first point in time may be chosen to be during time frames when the device's battery levels are higher. In the case of solar-powered stations, when the amount of charge drops below a threshold amount, energy may need to be conserved until the battery can be charged. The station may not be able to perform all network operations when in energy conservation mode. Therefore, the first point in time may be determined to be a time when stations in the routing path have charge above the threshold amount.

In some embodiments, the one or more processors 310 of central control system 300 may determine components related to the first point in time, such as, for example, the one or more routing paths, and/or the amount of charge in the batteries of one or more of the nodes in the network 100. The one or more processors 310 may then transmit the determined components to the one or more processors 220 of the end user premises device 120 for further processing. In alternative embodiments, the one or more processors 310 may determine the first point in time and transmit the first point in time to the one or more processors 220 of the end user premises device 120.

At block 406, the one or more processors 220 may retrieve, at the first point in time, the data via the network 100. Any known methods of retrieval may be used by the one or more processors 220 to retrieve the data via the network 100. At block 408, the one or more processors 220 may store the data in the memory 222 of the end user premises device 120. For the example in FIG. 2, the video file may be retrieved from memory 242 of server 180 at 4:45 pm, and may be stored at the memory 222.

At block 410, the one or more processors 220 may transmit the data to the client device 110 in response to a second user request. The second user request may be received from the client device 110 and may cause the one or more processors 220 of the end user premises device 120 to access the memory 222 and send the requested data to the client device 110.

FIG. 5 shows a flow diagram 500 that may also be performed at the end user premises device 120 in addition to flow diagram 400. At block 502, the one or more processors 220 may optionally be configured to predict what data client device 110 may access at a predicted future access time, or a third point in time. The one or more processors may make the prediction or rather, identify predicted data, based on the user's activity history at the client device 110, including timing of access, and other user information provided by the user at the client device 110, such as, for example, location, demographic information, and interests. For example, the activity history may indicate that a particular news site is frequently accessed at or around 8 am on weekdays and a workout video is frequently accessed around 8 pm on weekdays. Based on this activity history, the predicted data may include some content of the particular news site, such as background and foreground elements, with the predicted future access time of 8 am, and the workout video with the predicted future access time of 8 pm.

At block 504, a fourth point in time may be determined for retrieval of the predicted data. During an off-peak time before the third point in time. In some cases, the fourth point in time may be determined similar to the first point in time as described above. The fourth point in time may be determined to be the same as the first point in time or may be different. The fourth point in time for retrieving the background and foreground elements of the particular news site may be at or around 4 am, during the off-peak time during sleep hours and closer in time to the 8 am predicted future access time. The fourth point in time for retrieving the workout video may be around 4:45 pm, during the off-peak workday hours, the same time as the first point in time.

At block 506, the predicted data may be retrieved via the network 100 at a fourth point in time, and at block 508, the predicted data may be stored, or cached, in the memory. At block 510, when a user request for data that is included in the predicted data is received from a client device, the one or more processors 220 may access the memory 222 and transmit the predicted data to the client device. For example, when the user requests the particular news site using the client device 110, the one or more processors 220 of the end user premises device 120 may determine that the background and foreground elements of the particular news site is already stored in memory 222 of the end user premises device 120 and transmit the background and foreground elements directly to the client device 110. Other elements and content of the particular news site may be requested and received from the destination address at the time of the user request.

FIG. 6 shows a flow diagram 600 that may be performed at the central control system 300. In some embodiments, the central control system 300 may perform the time determinations and predictions described above. The central control system 300 may also send instructions to nodes of the network 100 to cause data retrieval according to the time determinations and predictions.

At block 602, the one or more processors 310 of the central control system 300 may receive a first user request for data. The first user request may identify data to be retrieved, such as using a destination address, as described above in block 402. Using the same example as block 402, the destination address may indicate a location in the memory 242 of server 180. In some implementations, the first user request for the data may be an aggregation of a plurality of user requests from a plurality of client devices for the same data. For example, a first client device and a second client device may request the same movie. These two separate requests may be aggregated and treated as the first user request.

At block 604, the one or more processors 310 may determine a first point in time at which to retrieve the requested data. The first point in time may be determined in a similar manner to that which is described above in block 404, taking into account off-peak hours, a second point in time at which the data will likely be accessed, and other factors. When the first client request is an aggregate of multiple client devices, the first point in time may be determined based on the likely future access time for each client device. For instance, the second point in time may be determined by using the earliest likely future access time or by averaging the likely future access times of the client devices. Continuing the example from block 602, the first client device may have a likely future access time of 7 pm, and the second client device may have a likely future access time of 8 pm. The second point in time may be the earlier of the two, or 7 pm, or alternatively the second point in time may be the average of the two, or 7:30 pm.

At block 606, the one or more processors 310 may send instructions to the network nodes to cause the data to be sent to the end user premises device 120. In this example, the instructions may be transmit from the central control system 300 through the network 100 to server 180, where the destination address leads. In response, the one or more processors 240 of server 180 may retrieve the data from the memory 242 and send the data through the network 100 to end user premises device 120 for storage in memory 222 at the determined first point in time.

In some implementations, the one or more processors 310 may cause the predicted and/or requested data to be broadcast to a plurality of end user premises devices in the network 100. The one or more processors 310 may broadcast the data to the plurality of end user premises devices from a single station in the network 100, or may send the data to a plurality of end user premises devices from a plurality of stations. The one or more processors 310 may use LTE Broadcast, also known as Evolved Multimedia Broadcast Multicast Services (eMBMS)/Mobile-Broadcast Single-Frequency Network (MBSFN), or other known protocols.

For the first and second client devices that requested the same movie, the first client device may have access to a first end user premises device, and the second client device may have access to a second end user premises device. The one or more processors 310 may cause one station, such as station 130, to multicast the requested movie at the first point in time to the first end user premises device and the second end user premises device for storage. Alternatively, the one or more processors 310 may cause a first station, such as station 130, to transmit the movie at the first point in time to the first end user premises device, and a second station, such as station 150, to transmit the movie at the first point in time to the second end user premises device.

At block 608, the one or more processors 310 may predict what data a client device or a plurality of client devices are likely to access. The prediction may also include an indication of when the client device(s) will access the predicted data, such as a third point in time. For a single client device, the one or more processors 310 may make the prediction based on the user's activity history at the client device 110 and other user information provided by the user at the client device 110 similar to the manner described in block 502. For the plurality of client devices, the one or more processors 310 may take into account the common activity history at each of the plurality of client devices and the common user information provided at each of the plurality of client devices.

For example, for the first client device and the second client device, the one or more processors may determine that both the first client device and the second client device are located in the same geographic area, such as, for example, San Francisco, California. The one or more processors 310 may predict that both the first client device and the second client device may access videos related to the local sports teams and/or websites for local news agencies. The predicted data for retrieval for the plurality of client devices may therefore include recent videos for the local sports teams and/or background and foreground elements for local news agencies' websites.

At block 610, the one or more processors 310 may determine a fourth point in time for retrieving the predicted data. The fourth point in time may be determined similar to the methods described above in blocks 404 and 604. At block 612, the one or more processors 310 may send additional instructions related to retrieving the predicted data, as described in block 604. In some cases, the one or more processors 310 may broadcast the predicted data to a plurality of end user premises devices. For example, for data predicted based on a given geographic area, the one or more processors 310 may broadcast the predicted data to the end user premises devices in the same geographic area, such as the first end user premises device and the second end user premises device.

The features described may allow users to access content over a network quicker. Because retrieval may be shifted to non-peak hours, network congestion during peak hours may be alleviated. When non-peak hours correspond to daytime work hours, solar-powered network nodes may be able to conserve battery and therefore operate for longer periods of time in the evening. More people may be able to access requested data during peak hours since at least some of the data may already be stored at the end user premises device. In addition, content retrieved for a particular user or demographic may be personalized. Since content may be pre-stored at the end user premises device, the risk of outages may be reduced.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A central control system comprising:
   a memory;
   one or more transceivers configured to communicate with a network that includes one or more stations linked to one or more end user premises devices, wherein each of the one or more end user premises devices are connected to a client device; and
   one or more processors configured to:
   receive a first user request for data from the client device via the one or more transceivers;
   determine a first point in time to retrieve the data based on an amount of charge in batteries of the one or more stations in the network;
   send instructions to the network at the first point in time to facilitate the transmission and storage of the data on the network;
   receive a second user request for data from the client device using the one or more transceivers; and
   after receiving the second user request, send instructions to the network to transmit the retrieved data to the client device.

2. The central control system of claim 1, wherein the one or more stations have limited power supply.

3. The central control system of claim 1, wherein the first point in time is chosen to be during time frames when the amount of charge in batteries of the one or more stations are above a threshold amount.

4. The central control system of claim 1, wherein the one or more stations are solar-powered high altitude platform (HAP) stations.

5. The central control system of claim 4, wherein when the amount of charge in batteries drops below a threshold amount, the one or more stations enter a conservation mode until the batteries are charged.

6. The end user premises device of claim 1, wherein the one or more processors are further configured to determine that the second user request includes a request for the retrieved data stored in the network.

7. The central control system of claim 1, wherein the first point in time is during off-peak hours and before a second point in time that the client device is likely to access the retrieved data.

8. The central control system of claim 7, wherein the one or more processors are further configured to:
predict additional data that is likely to be accessed by the client device at a third point in time;
send instructions to the network at a fourth point in time before the third point in time, to retrieve and store the additional data from the remote server via the network using the one or more transceivers;
receive a third user request for data from the client device using the one or more transceivers; and
after receiving the third user request, send instructions to the network to transmit the additional data to the client device using the one or more transceivers.

9. The central control system of claim 8, wherein the one or more processors are further configured to determine the second point in time based on an access time included in the first user request.

10. The central control system of claim 8, wherein the one or more processors are further configured to determine the second point in time based on an activity history at the client device.

11. A network comprising:
a central control system that includes:
a memory;
one or more transceivers configured to communicate with a network that includes one or more stations linked to one or more end user premises devices, wherein each of the one or more end user premises devices are connected to a client device; and
one or more processors configured to:
receive a first user request for data from the client device via the one or more transceivers;
determine a first point in time to retrieve the data based on an amount of charge in batteries of the one or more stations in the network;
send instructions to the network at the first point in time to facilitate the transmission and storage of the data on the network;
receive a second user request for data from the client device using the one or more transceivers; and
after receiving the second user request, send instructions to the network to transmit the retrieved data to the client device.

12. The network of claim 11, wherein the one or more stations have limited power supply.

13. The network of claim 11, wherein the first point in time is chosen to be during time frames when the amount of charge in batteries of the one or more stations are above a threshold amount.

14. The network of claim 11 wherein the one or more stations are solar-powered high altitude platform (HAP) stations.

15. The network of claim 14, wherein when the amount of charge in batteries drops below a threshold amount, the one or more stations enter a conservation mode until the batteries are charged.

16. The network of claim 11, wherein the one or more processors are further configured to determine that the second user request includes a request for the retrieved data stored in the network.

17. The network of claim 11, wherein the first point in time is during off-peak hours and before a second point in time that the client device is likely to access the retrieved data.

18. The network of claim 17, wherein the one or more processors are further configured to:
predict additional data that is likely to be accessed by the client device at a third point in time;
retrieve, at a fourth point in time before the third point in time, the additional data from the remote server via the network using the one or more transceivers;
store the additional data in the memory;
receive a third user request for data from the client device using the one or more transceivers; and
after receiving the third user request, transmit the additional data to the client device using the one or more transceivers.

19. A method comprising:
receiving, by one or more processors at a central control system, a first user request for data from a client device;
determining, by the one or more processors, a first point in time for retrieving the data based on an amount of charge in batteries of one or more stations in a network;
sending instructions to the network at the first point in time to facilitate the transmission and storage of the data on the network;
receiving a second user request for data from the client device using the one or more transceivers; and
after receiving the second user request, sending instructions to the network to transmit the retrieved data to the client device.

20. The method of claim 19, wherein the first point in time is during off-peak hours and before a second point in time that the client device is likely to access the retrieved data.

* * * * *